(12) United States Patent
Sindell

(10) Patent No.: US 12,375,476 B2
(45) Date of Patent: *Jul. 29, 2025

(54) AUTHENTICATION FRAMEWORK

(71) Applicant: Gerald Sindell, Napa, CA (US)

(72) Inventor: Gerald Sindell, Napa, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/733,780

(22) Filed: Jun. 4, 2024

(65) Prior Publication Data

US 2024/0333710 A1 Oct. 3, 2024

Related U.S. Application Data

(63) Continuation of application No. 17/535,438, filed on Nov. 24, 2021, now Pat. No. 12,003,499.

(51) Int. Cl.
| | | |
|---|---|---|
| *H04L 29/00* | (2006.01) | |
| *G06F 16/25* | (2019.01) | |
| *G06F 21/31* | (2013.01) | |
| *H04L 9/40* | (2022.01) | |

(52) U.S. Cl.
CPC .......... *H04L 63/083* (2013.01); *G06F 16/25* (2019.01); *G06F 21/316* (2013.01); *H04L 63/105* (2013.01); *H04L 2463/082* (2013.01)

(58) Field of Classification Search
CPC .......... H04L 63/083; H04L 63/105; H04L 2463/082; H04L 63/08; H04L 63/0861; G06F 16/25; G06F 21/316; G06F 21/31; G06F 21/45

See application file for complete search history.

(56) References Cited

U.S. PATENT DOCUMENTS

| | | | | |
|---|---|---|---|---|
| 6,584,454 | B1 * | 6/2003 | Hummel, Jr. | H04L 63/105 |
| | | | | 705/1.1 |
| 7,813,822 | B1 * | 10/2010 | Hoffberg | H04N 7/163 |
| | | | | 381/73.1 |
| 7,865,737 | B2 * | 1/2011 | Suyama | G06F 21/6209 |
| | | | | 713/185 |
| 8,316,237 | B1 * | 11/2012 | Felsher | H04L 63/061 |
| | | | | 380/282 |
| 8,689,294 | B1 * | 4/2014 | Thakur | H04L 63/08 |
| | | | | 726/16 |
| 10,567,375 | B1 * | 2/2020 | Mossler | H04L 63/101 |
| 11,863,564 | B1 * | 1/2024 | Podemsky | H04L 63/06 |
| 12,003,499 | B2 * | 6/2024 | Sindell | G06F 21/45 |
| 2002/0183115 | A1 * | 12/2002 | Takahashi | A63F 13/35 |
| | | | | 463/42 |
| 2004/0054885 | A1 * | 3/2004 | Bartram | H04L 9/3265 |
| | | | | 709/204 |

(Continued)

*Primary Examiner* — Don G Zhao

(74) *Attorney, Agent, or Firm* — McCarter & English, LLP

(57) ABSTRACT

An authentication framework includes client and central evaluation of user identity factors. A central global database can be configured to utilize prior authentications, user patterns, and third-party resources to assess current sign-in attempts. When no flags exist—such as by way of example when recent authentications are confirmed—additional identity factors are not requested. When flags exist, the system requests further identity factors. The framework can be configured to support phased authentication, central storage of user information, and synchronization among databases, and for use with existing authentication infrastructure.

15 Claims, 1 Drawing Sheet

(56) References Cited

U.S. PATENT DOCUMENTS

| | | | |
|---|---|---|---|
| 2006/0277176 A1* | 12/2006 | Liao | G06Q 10/10 707/999.005 |
| 2006/0282660 A1* | 12/2006 | Varghese | G07F 7/1083 713/155 |
| 2007/0050850 A1* | 3/2007 | Katoh | H04L 63/105 726/1 |
| 2007/0143829 A1* | 6/2007 | Hinton | H04L 63/0815 726/8 |
| 2009/0158425 A1* | 6/2009 | Chan | H04L 63/08 726/21 |
| 2009/0187983 A1* | 7/2009 | Zerfos | H04W 12/069 726/10 |
| 2011/0023112 A1* | 1/2011 | Murai | G06F 21/36 726/17 |
| 2012/0203906 A1* | 8/2012 | Jaudon | H04W 76/20 709/225 |
| 2012/0204235 A1* | 8/2012 | Jaudon | G06F 21/30 726/4 |
| 2013/0205373 A1* | 8/2013 | Jaudon | H04W 4/06 726/4 |
| 2014/0344896 A1* | 11/2014 | Pak | H04L 63/0861 726/4 |
| 2015/0095971 A1* | 4/2015 | Roffe | G06F 21/445 726/1 |
| 2015/0178489 A1* | 6/2015 | Nakano | G06F 21/35 726/19 |
| 2016/0087957 A1* | 3/2016 | Shah | H04L 63/205 726/1 |
| 2017/0041296 A1* | 2/2017 | Ford | G06F 21/64 |
| 2017/0230351 A1* | 8/2017 | Hallenborg | H04L 63/08 |
| 2017/0230363 A1* | 8/2017 | Deutschmann | H04W 12/065 |
| 2017/0257397 A1* | 9/2017 | Graham | H04L 63/20 |
| 2017/0352197 A1* | 12/2017 | Mitsunaga | G07B 11/00 |
| 2018/0191695 A1* | 7/2018 | Lindemann | H04L 63/0853 |
| 2020/0050751 A1* | 2/2020 | Woo | H04L 63/0861 |
| 2020/0127993 A1* | 4/2020 | Mossler | H04L 63/1416 |
| 2020/0137081 A1* | 4/2020 | Goldstein | H04L 63/083 |
| 2020/0162462 A1* | 5/2020 | Zayats | H04L 41/082 |
| 2021/0029491 A1* | 1/2021 | Monteleone | G07C 1/22 |
| 2021/0306335 A1* | 9/2021 | Avetisov | H04L 9/0643 |
| 2022/0131870 A1* | 4/2022 | McKinnon | G06Q 20/405 |
| 2022/0191192 A1* | 6/2022 | Dürr | H04L 63/0838 |
| 2022/0368129 A1* | 11/2022 | Saad | H04L 63/08 |
| 2024/0333710 A1* | 10/2024 | Sindell | G06F 21/316 |

* cited by examiner

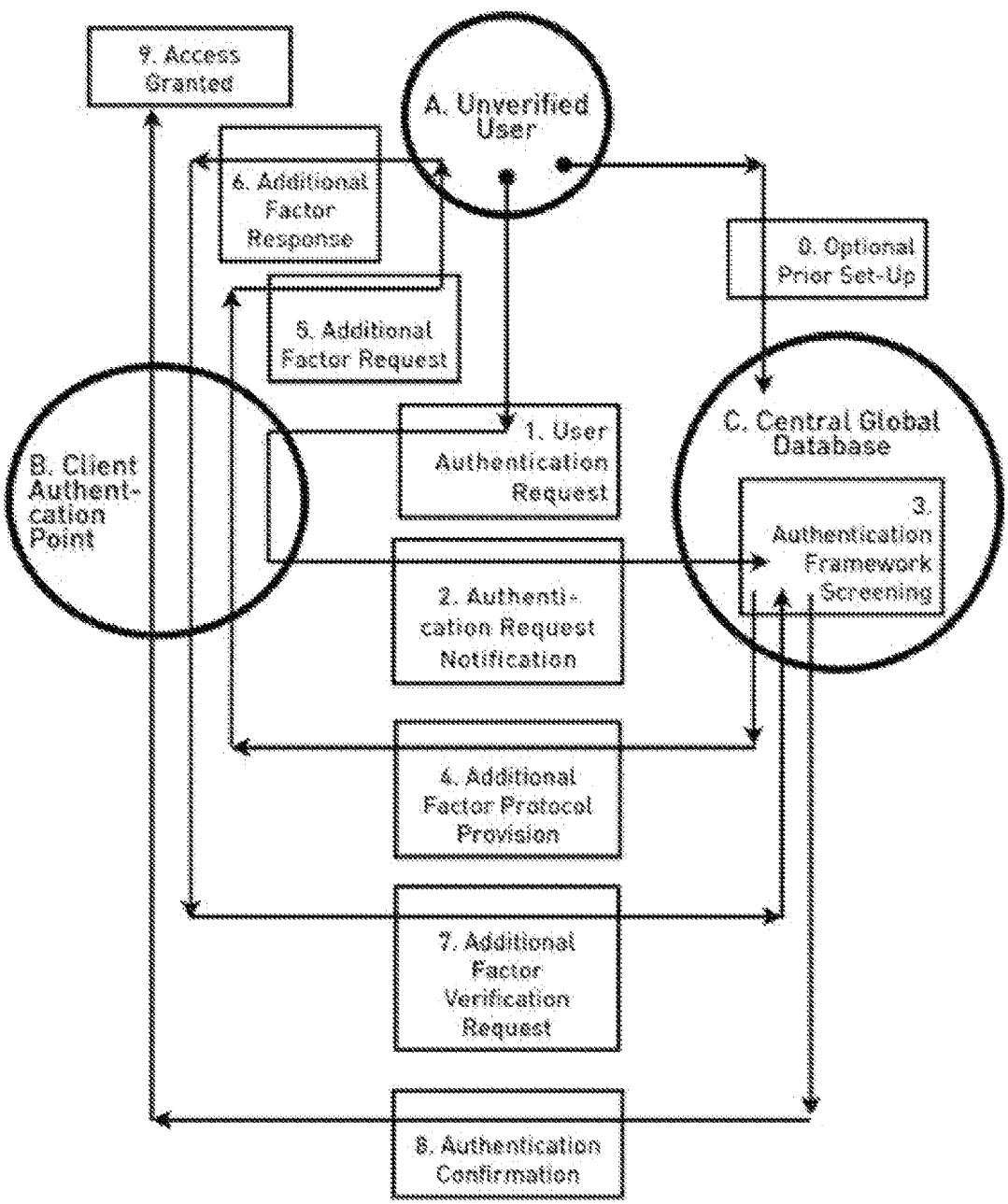

AUTHENTICATION FRAMEWORK

CROSS REFERENCE TO RELATED APPLICATIONS

This application claims benefit under 35 U.S.C. § 120 to co-pending U.S. application Ser. No. 17/535,438 filed on Nov. 24, 2021, entitled "Universal, Hierarchally-Outsourced Multi-Phased Authentication Framework with a Central Global Database," which is hereby incorporated by reference in its entirety as if fully set forth herein.

FIELD OF THE INVENTION

This invention relates to security and authentication systems.

BACKGROUND

Devices and systems such as ATMs, credit card POS terminals, mobile devices, secured personal access systems and identity cards, such as a passport, are vulnerable to identity theft. In the current authentication space, most systems depend upon a password or pin number, a credit card and signature or pin number, or an identification card or paper such as a driver's license or passport.

However, Users tend to employ the same password everywhere, so that the password is stolen in one location it can be used everywhere. Credit cards can be stolen both physically and electronically. Identity cards and papers can be stolen or forged.

The result of these authentication vulnerabilities is billions of dollars in fraud and the reluctance of a large segment of the world's population unwilling to use the internet for commerce. In addition, lack of security around access to secure areas, in such areas as airports is a constant security threat. In addition, credit card theft is a global plague with losses in the billions of dollars.

Stronger authentication is a pervasive need for commerce, personal security, border security, and privacy.

SUMMARY

It is therefore an object of the present invention that one or embodiments thereof address, mitigate or overcome one or more of the drawbacks and/or disadvantages of prior systems.

In one aspect, an authentication framework comprises a Client, a first database accessible to the Client, and a Central Global Database including a second database. In at least some embodiments, the first and second databases can be the same database. In other embodiments, the first and second databases are different databases. In at least some such embodiments, the Client does not have access to the second database.

The Client can present an authentication request to a user attempting to sign in or to be authenticated by the Client via a Point of Client Authentication Requirement in order to access an electronic system. The Client can receive (i) a first Identity Factor from the user and, (ii) when a second Identity Factor is required by the Client for the user to sign in or be authenticated by the Client, The Client can receive a second Identity Factor from the user. The Client can then determine whether the first and/or second Identity Factors matches corresponding information in the first database. The Client can then (i) inform the Central Global Database that the user is attempting to sign in or to be authenticated by the Client; (ii) forward to the Central Global Database the first Identity Factor and/or second Identity Factor; and (iii) report to the Central Global Database the Client's determination the first and/or second Identity Factor matches corresponding information in the first database.

The Central Global Database can then search for current knowledge about the user. In doing so, the Central Global Database utilize, for example, data gathered from the user's current attempt to sign in or to be authenticated by the Client, data from a history of previous attempts by the user to sign in or otherwise to be authenticated by the Client via other Points of Client Authentication Requirement, other metrics including an IP address from which the user is currently attempting to sign in or be authenticated, past and/or present key entry speed of the user, previous habits of the user, information that the user has previously inputted to the Central Global Database, and/or other information which the Central Global Database received through subscription to third party resources. Those of ordinary skill in the art should understand, however, that the foregoing is merely exemplary, and the invention is not limited to the expressly enumerated examples. Rather, the Central Global Database can search for, obtain and/or use any knowledge or information about the user.

The Central Global Database also can determine whether any Flags exist with respect to the user's current attempt to sign in or to be authenticated by the Client. When Flags exist, either the Central Global Database or the Client can request an additional Identity Factor from the user. In some embodiments, the Central Global Database can transmit a request to the Client that the Client request the additional Identity Factor from the user. In such embodiments, after the Client receives the additional Identity Factor from the user, the Client can transmit the additional Identity Factor to the Central Global Database. In other embodiments, the Client can proxy the Central Global Database for the Central Global Database to request the additional Identity Factor from the user.

The can then evaluate the authentication of the user using the additional Identify Factor. If the user is authenticated, the Central Global Database can provide confirmation of authentication of the user to the Client. The Client can then, after receiving such confirmation grant the user access to the electronic system.

However, if after evaluation of the authentication of the user by the Central Global Database Flags still exist, further additional Identify Factor(s) can be requested by the user. The process is repeated until no Flags exist. Then, confirmation of authentication of the user and grant of access to the electronic system for the user can be executed.

In at least some embodiments, the additional Identify Factor(s) can include an activity, location and/or authentication transaction of said user occurring within a day of the user's current attempt to sign in or to be authenticated by the Client. In some embodiments, the additional Identity Factor includes a purchase and/or payment of the user. In some embodiments, the activity, location and/or authentication transaction is one that occurred within a pre-defined number of hours prior to the user's current attempt to sign in or to be authenticated. In some embodiments, the request to provide further additional Identify Factor(s) to the user can include a question, which in some such embodiments includes a multiple-choice question.

In another aspect, a service provides a universal, hierarchically-outsourced multi-phased authentication framework with a central global database. Universal in that the system is intended to serve all potential global users simultaneously;

hierarchically-outsourced in that the system offers various levels of authentication in a pre-set sequence that uses both the institution's own internal database as well as the system's central database depending on the preset preferences of both the institution and the individual; multi-phased in that the system has the capacity of using a wide variety of existing and future authentication methodologies; a global central database in that by being capable of tracking a user's patterns constantly and in real-time the system provides a significantly higher level of accuracy than any isolated database would be capable of.

Other objects and advantages of the present invention will become apparent in view of the following detailed description of the embodiments and the accompanying drawings.

BRIEF DESCRIPTION OF THE DRAWINGS

FIG. 1 is a block diagram of an individual user engaged in the process of attempting to self-authenticate.

DETAILED DESCRIPTION

The following disclosure describes examples of some embodiments of the invention. The designs, figures, and description are non-limiting examples of some embodiments of the invention. Other embodiments of the system may or may not include the features disclosed herein. Moreover, disclosed advantages and benefits may apply to only some embodiments of the invention, and should not be used to limit the scope of the invention.

Referring to FIG. 1, there is shown three areas identified by their being represented in a circle or oval: "A": The User "The Unverified User," "B": the authentication service provider "Central Global Database" and "C." a Client enterprise "Point of Client Authentication Requirement" which is using the services provided by the Central Global Database.

While the "User" can be any unique individual person, in other embodiments, a user can be any type of entity. In one embodiment, the "Central Global Database" is a universal authentication database gathering user information and providing authentication services throughout the world. In other embodiments, the Central Global Database can exist in multiple locations and multiple partitions.

The "Point of Client Authentication Requirement" is any point of contact where a User needs to demonstrate who they are in order to access and manage information, use debit or credit cards, or manage their finances. A "Client" is any company, organization or entity that subscribes to the authentication services provided by the Central Global Database.

The "Point of Client Authentication Requirement" may be a website, an Automatic Teller Machine, a credit or debit card terminal, a secured door with a coded locking system, a political boundary such as a border crossing station, a law officer's computer in their vehicle, a voting station, and any other location at which one person must be able to authenticate that they are indeed the person whom they represent themselves as being in order to gain access or be accurately recognized.

An "Identity Factor" is any information that increases the level of assurance that a person is who they claim to be. Identity Factors include 1) what someone knows such as a username, password, answer to a secret question, 2) something that someone is physically, such as having a particular fingerprint, location, iris scan, or voiceprint, or 3) something someone possesses, such as a key, token, magnetic card or identification card.

A "Flag" is a data point that indicates a departure in the authentication process from predetermined norms about both the particular User and departure from norms for all users. Use and operation of the embodiment shown in FIG. 1 is as follows.

Step 0

Before use, the User has the option of signing in at the Central Global Database and changing his or her authentication process or data, such as a password or secret question and answer.

Step 1: User Authentication Request

Whether or not the User has previously taken Step 0, the authentication process begins, at Step 1 with the User initiating an Authentication Request. The Request can be in the form of entering an Identity Factor such as a username on a website, the presentation of a debit card at a retail store, or through the presentation of a number of other Identity Factors. Depending on the preference of the Client, the User may enter a secondary Identity Factor such as a password immediately following their entry of their username.

Step 1a: (not Illustrated) Optional Two-Phase Authentication

A website may present its own Identity Factor to the User through the presentation of an image or other previously agreed upon symbol that indicates to the User that they are asking to be authenticated at their intended Authentication Point.

Step 1b

If a second Identity Factor such as a PIN number is required, and if it has not previously been submitted, the User enters it.

Step 2: Authentication Notification

The Client looks up the username, PIN, and any other Identity Factor offered in the Authentication Request and checks the information against its own database for matches. Whether or not the information matches the Client's internal database, the Client informs the Central Global Database that the User is attempting to authenticate with this information and forwards the Identity Factor information to the Central Global Database and includes a report of the status of the Identity Factors matches to the Client's internal database.

Step 3: Authentication Exchange Screening

The Central Global Database searches for current knowledge about the User, employing data gathered from the Authentication Request, from a history of previous Authentication Requests from the same User at other Client Authentications Points (including in the previous few hours and days), other metrics including but not limited to the User's IP address, key entry speed, previous habits, User information that the User has previously inputted (in Step 0) and other information which the Central Global Database may have received through subscription to third party resources. Various algorithms can dictate whether any serious discrepancies raise "flags" or warnings about the accuracy of Identity Factors and quality of other Authentication information submitted so far. If there are no flags, the next step is Step 8. On the other hand, if there are flags, the next step is Step 4.

Step 8. Authentication Confirmation (and Data Synchronization)

The Central Global Database transmits an "okay" back to the Client, indicating the Client can grant access to the User. If there has been a change in password, PIN, or other authentication means that the User has had the option (in Step 0) of changing prior to the Authentication Request, the Central Global Database will inform the Client of the password or other change so that the Client can update their internal database. Similarly, if the Client has received updated sign-in information from the User, that information will update the Central Global Database.

Step 4: Additional Factor Protocol Provision

There are two alternate paths for Step 4, depending on which system has been previously elected by the Client. With Path 1, the Client functions as middleman in the authentication upgrade. If flags were discovered, the Central Global Database will transmit a Level Increase to the Client with a request to ask the User for an additional Identity Factor. The Central Global Database will transmit the specific request to the Client and when the User responds, the Client will return that response to the Central Global Database. With Alternate Path 2, the Client proxies the Central Global Database to conduct the authentication upgrade directly. This upgrade may include a number of presently known authentication methods or those yet unknown. Known authentication methods include the transmission of a password or passcode to the User's mobile phone, a voiceprint request, or the answer to a secret question.

Step 5: Additional Factor Request

The Client or the Central Global Database presents the User with an additional Identity Factor request in response to the elevated authentication request.

Step 6: Additional Factor Response

The User provides an additional Identity Factor, which is either passed back to the Central Global Database by the Client or goes directly to the Central Global Database, depending on which Path in Step 4 is the previously-agreed upon operating structure.

Step 7: Additional Factor Verification Request

The Client asks for confirmation of authentication, or if the Central Global Database is conducting the Level Increase directly, the Central Global Database makes an authentication decision. If there are no flags, the next step is Step 8. If there are flags, the system may loop to Step 5.

Step 8. Authentication Confirmation

The Central Global Database confirms the authentication and provides confirmation of authentication to the Client . . . .

Step 9. Access Granted

The Client grants access to User.

Some embodiments include a customized series of requests to the Central Global Database by any individual Client which may be triggered by an unusual item that surfaced during the initial authentication process, such as a great change in distance from a previous login attempt by a user of the same name within a short time period, or a request by a user to transfer an amount of money above a certain preset level.

In Step 0, there a more options for the User to control their centralized identity. The User has the opportunity to change or remove their password(s) for all sites, add additional identities, change their secret questions, provide special information regarding forthcoming travel, add token systems, add upgrade levels to various specific transactions such as would be required to initiate a wire transfer. In the instance of suspected identity theft, the User would need to go to only the Central Global Database to quickly change all their passwords and other forms of identification, such as tokens.

In other embodiments, when a user believes his or her identity has been stolen or compromised, the user can access a control panel and "Suspend" all authentication everywhere. The user can then go about re-setting passwords and other tokens.

The central database has the capacity to function as a clearinghouse for authentication information in that the database aggregates information and, at a User's direction, can propagate this information to other Clients. In the instance where the User changes their password at a Client site, the Central Global Database will be automatically updated of that change for that specific site.

In at least some embodiments, the system is adaptable to conform with the requirements of the Levels 1 through 4 authentications as defined in the National Institute of Standards and Technology. Special Publication 800-63, Version 1.0.2, "Electronic Authentication Guideline."

If for some reason the speed of the service slows, the transactions can take place without the system being involved. For example, the legacy authentication process can be left intact. In other words, the system maintains the accuracy of the legacy authentication so that it remains viable if the system is unavailable.

In still other embodiments, the system can be Boolean and become more algorithmic over time.

A New Authentication Factor Based on Previous Authentication Attempts

In yet further embodiments, the system comprises an authentication factor based on other authentication attempts within a recent time period. Increasingly, institutions are relying on "challenge" authentication factors to defend against illegitimate user access. The current state of the art of challenge questions are of two basic kinds: 1) those drawn from 'secret' questions and answers the user has previously entered into the system, and 2) those drawn from knowledge about the user gained from access to financial records databases, including car payment amounts. The shortcomings of these factors is that the information they rely upon can be gained by third parties, including unauthorized third parties. Credit history information can be acquired by criminals. The knowledge behind secret challenge questions, such as a mother's maiden name or the name of a first pet, are frequent targets of imposters, and the answers to secret questions, once gained, can be used to access a user's accounts everywhere. Basically, challenge questions as they exist currently are very much like passwords. Once hacked or stolen, they become liabilities to the security of the user, as opposed to being security assets.

Accordingly, in at least some embodiments, the system globally gathers authentication attempts and uses information gained from earlier activity to make judgments about the quality of subsequent authentication attempts in other venues. For example, a sign-in to Facebook at 8:00 AM provides information that can authenticate an attempted use of an ATM at 9:00 AM, with the system comparing location, time of day, user habits, and where else the user has been in the previous few hours.

The system also has the ability to create challenge questions arising out of the user's immediate proximate authentications. These attempts occur throughout the typical person's typical day, e.g., going online first thing in the morning to check one's mail, dropping in on a social media site, buying a cup of coffee at the local coffee shop, driving through an automated toll system (such as EZ pass), authentication at one's place of work with a card swipe, signing in to work using one's employee badge, using a debit card to buy lunch, etc. In-the-moment challenge questions uses everyday data to create multiple choice challenge questions that can be used when an institution desires a higher level of authentication, often called multi-factor authentication. The first factor is username, the second would be password, the third would be a in-the-moment multiple choice question posed to the user, e.g., through the sign on screen at a financial institution, the screen on an ATM, to a smart phone via SMS, telephonically, etc. As an example, the in-the-moment question could ask which of three time periods the user had last passed through a toll bridge, bought a coffee, signed in to work, or accessed Facebook.

These time-dependent contextual challenge questions are valid only for a few hours, so their value, if overheard or intercepted, is minimal. Further, because the challenge questions are based on activity as opposed to knowledge stored in the system, the system reduces the need to collect and retain personal user data. In addition, the possibility of an imposter having knowledge of these question or answers is extremely low, requiring that the imposter track every movement and activity of the user for an indeterminate period of time. Moreover, the imposter would need to be in close proximity to the legitimate user at the moment of fraudulent attempt, since the system tracks the hourly path of authentication attempts of the legitimate user.

Global Universal User Unique Identity

In still another embodiment, the system utilizes an eternal global universal user identifier. Currently, many countries assign an identification number to each of their citizens for the life of that citizen. These numbers function as identification, as passport numbers, as national health numbers, as retirement account numbers, and more. The size and format of these numbers, however, vary by country or region. For large global organizations trying to serve their customers, this completely non-standard way of identifying individuals creates errors, mis-identifications, confusions, and the opportunity for imposters to create false identities. Thus, it would be desirable if each person on earth could have their own unique global identifier, for commercial, security, convenience, identity protection and for the benefit of statistical analysis both now and far into the future.

In at least one embodiment, the system creates a unique, eternal, identity for each person on the planet. It is unique in that that each identifier can, for example, be that person's identifier forever, and no two individuals need ever share the same number, now or into distant centuries in the future. Such can be eternal because, unlike, for example, the current U.S. Social Security Administration's practice that re-uses a Social Security number ten years after an individual has become deceased, the identifier can remain with an individual in perpetuity. In at least some embodiments, the identifier comprises a combination of blanks, numbers and letters. For example, it could be in the form of a seven or eight character 'word' comprised of 1) blanks, 2) Arabic numbers, i.e. 0 though 9 and 3) the Latin alphabet, i.e. the letters A through Z.

The Global Unique Identity can be assigned by the system as new individuals are identified and enrolled. Enrollment may take place in a number of different way. For example, when a financial or other service institution has passed reliability standards and becomes a client of the authentication service, all of the institution's customers become enrolled the Global Unique Identity database. As another example, a governmental institution may choose to enroll their entire citizenry in the database, and if that government passes reliability standards, those citizens may be enrolled. As yet a further example, individuals may apply individually for enrollment at an in-person enrollment facility, or a designated authorized enrollment facility and present documentation that can be accepted for enrollment.

Use of this unique identifier, can reduce authentication fraud or errors by gathering a database of the recent locations of an individual, their travels and their authentication habits. In at least some embodiments, data about an individual can be purged over time, such as within a 36-48 hour period. Further, in at least some embodiments, the system can be configured so as to not learn or obtain the contents of an individual's transactions. Yet in at least some embodiments, the system can create models of the individual in order to protect that individual against authentication fraud and identity theft.

In further embodiments, the system creates a vanity version of the eternal global universal user identification. Every person who is enrolled in the system and is assigned a Global Universal Identity can be assigned a "word" that is unique to them, comprised of blanks, numbers and letters. In at least some embodiments, individuals have the option of purchasing a "vanity" identification alias on an annual or lifetime renewal basis. The vanity identifications may be as short as a single letter or number, or as long as a user's first initial and last name. The size of the alias can be adjusted to account for system needs. For example, only a few users will be able to purchase one or two digit number-only aliases. It is contemplated that users will purchase an alias that relates to their legal name, so that, for example, no one will be able to reserve someone else's initials without that also being closely related to the purchaser's legal name. This may prevent the development of a secondary market in which first adopters purchase large numbers of aliases and then sell them at higher prices. Those who purchase one will have the ability to identify themselves easily and uniquely anywhere on Earth, simply offering their alias. The authentication system can confirm their identity, connecting the alias to the correct related Global Unique Identity.

Duplicative Identifiers

In at least some embodiments, the system identifies duplicate occurrences of third-party identifiers such as device identifiers, user names, credit card numbers and social security numbers. When the system identifies such duplications, the system can trigger a fraud alarm. This is different from authentication in real-time (which occurs only at the moment of an authentication attempt). This detection could be constant, looking at the entire database and yielding possible imposters who have been successfully accessing another user's account.

Authenticating a Mobile Device as if it were a Person

In the current environment, there is considerable pressure coming from both consumer and business forces to have mobile devices be able to be used as reliable authentication proxies. People want their mobile device to be a secure proxy so they can use them to identify themselves, to make payments, to access secure information (such as their bank accounts). One challenge is that is the current state of authentication is profoundly flawed, having come to a limit imposed by an unwillingness of consumers to accept requests to increase the complexity of their passwords and change them more frequently. This limit is referred to as an "Authentication Wall"—that point at which the quality of authentication can only increase by means other than making increased demands on consumers. So the notion that it would be desirable for authentication to be delegated, or proxied, to a mobile device creates another area of authentication vulnerability on top of an already fragile authentication environment.

An aspect of making mobile devices secure is that they can be as reliably identified as their owners. For mobile device authentication to work, there also needs to be a reliable way to link the device to the individual. For a single institution trying to validate both the user and the device, the problem can be insurmountable. It is difficult enough for a merchant or a financial institution to detect an imposter customer and it is even more difficult to detect a stolen or imposter mobile device.

The invention can make it possible for mobile devices to be a secure part of the authentication chain by treating mobile devices the same way it establishes the accurate identity of a human individual, e.g., by real-time tracking of previous authentication attempts and gathering a fabric of the user's pattern. By gathering all information about a device's attempts to be used as a proxy, and by comparing that information to the user's authentications with and without the device, the invention can provide a high level of security for mobile device authentication attempts.

In at least some embodiments, it can do so by gathering a wide spectrum of information from outside the customary process. Current authentication is generally binary. A person wants to identify themselves for the purpose of gaining access and access is either granted or denied based on the evidence provided by the applicant. The current architecture as inherently a "fortress" approach. To improve it one can build higher or thicker walls, make the doors narrower, and just continue to make it harder to get in.

In contrast, architectures disclosed herein breakthrough to an "outside the fortress walls" architecture. Information gathered from a broad window of time and activities creates a full real-time 360-degree view of the user. When that knowledge is brought to bear on the authentication attempt, it moves from the peephole of the fortress to the high-definition of real knowledge of the user to identity itself.

The invention need not replace an institution's existing authentication infrastructure, but rather, enhances it. It can provide an auxiliary mechanism for users to manage multiple log-ins, passwords, and other authentication factors in a central location. As discussed above, certain embodiments create unique, highly-customized in-the-moment challenge questions that obviate the need for other secondary authentication factors. Certain embodiments can create a Global Unique Identifier for every adult on earth who needs to authenticate themselves (e.g., debit cards, social media, driver's license). Having a unique identifier for everyone can assist in protecting the identity of each person and to be able to provide reliable authentication.

It might be misunderstood that every mobile device has one or more unique identifiers. For example, they have serial numbers, IMIE, ICCID, MEID numbers, etc. However, because each of these identifiers/numbers is generated by either the manufacturer or the carrier, it can be duplicated or hacked. Furthermore, it is beyond the scope of any manufacturer to be able to track the identity of a device when ownership changes, or a different carrier is selected.

When, under the invention, an identity is created for each mobile device, that identity stays with the device regardless of change in ownership or carrier. The identity of the device is retired only with the end of the device's service life.

Matching Up Individuals and Devices

In at least some embodiments, the first time a user uses a new mobile device to authenticate themselves, the system will create a link between the user and the device. Whenever the device is used for authentication from that point forward, the system can ascertain, at the moment of attempt, whether the user and the device are aligned in time, place, habit, recent authentications, and other proprietary rules. If there is a discrepancy, the user will be asked challenge questions that the system derives from user activities in the previous day or previous few hours to assure authentication accuracy. If a device has been stolen, or if the device's internal identifiers have been hacked and their use is being attempted by an imposter, authentication can be denied.

Control Panel

The invention can, in at least some embodiments, provide access for every user to a single point web-based control panel of their identity. In certain embodiments, a page shows the user the various mobile devices that are currently associated with the user. In some such embodiments, the user may change the status of their devices to one of the following states: A-active, B-transferred, C-no longer in use, and D-lost or stolen. The control panel will show showing which apps access what information, and allow the user to change those settings.

Physical Security of the Device Issues

In at least some embodiments, if the device is stolen or hacked, the system will instantly stop the device from being used for authentication of any kind.

Aligning Human and Mobile Device Identity

In at least some embodiments, the system keeps the identity of the user and of various mobile devices in alignment, and detects when they no longer are, protecting the user the instant their device is stolen or its identifier cracked or duplicated.

The various illustrative logical blocks, modules, and processes described herein may be implemented as electronic hardware, computer software, or combinations of both. To illustrate this interchangeability of hardware and software, various illustrative components, blocks, modules, and states have been described above generally in terms of their functionality. However, while the various modules are illustrated separately, they may share some or all of the same underlying logic or code. Certain of the logical blocks, modules, and processes described herein may instead be implemented monolithically.

The various illustrative logical blocks, modules, and processes described herein may be implemented or performed by a machine, such as a computer, a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, a controller, microcontroller, state machine, combinations of the same, or the like. A processor may also be implemented as a combination of computing devices, e.g., a combination of a DSP and a microprocessor, a plurality of microprocessors or processor cores, one or more graphics or stream processors, one or more microprocessors in conjunction with a DSP, or any other such configuration.

The blocks or states of the processes described herein may be embodied directly in hardware, in a software module executed by a processor, or in a combination of the two. For example, each of the processes described above may also be embodied in, and fully automated by, software modules executed by one or more machines such as computers or computer processors. A module may reside in a computer-readable storage medium such as RAM memory, flash memory, ROM memory, EPROM memory, EEPROM memory, registers, hard disk, a removable disk, a CD-ROM, memory capable of storing firmware, or any other form of computer-readable storage medium known in the art. An exemplary computer-readable storage medium can be coupled to a processor such that the processor can read information from, and write information to, the computer-readable storage medium. In the alternative, the computer-readable storage medium may be integral to the processor. The processor and the computer-readable storage medium may reside in an ASIC.

Depending on the embodiment, certain acts, events, or functions of any of the processes or algorithms described herein can be performed in a different sequence, may be added, merged, or left out all together. Thus, in certain embodiments, not all described acts or events are necessary for the practice of the processes. Moreover, in certain embodiments, acts or events may be performed concurrently, e.g., through multi-threaded processing, interrupt processing, or via multiple processors or processor cores, rather than sequentially.

Conditional language used herein, such as, among others, "can," "could," "might," "may," "e.g.," and from the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out features as applied to various embodiments, it will be understood that various omissions, substitutions, and changes in the form and details of the logical blocks, modules, and processes illustrated may be made without departing from the spirit of the disclosure. As will be recognized, certain embodiments of the inventions described herein may be embodied within a form that does not provide all of the features and benefits set forth herein, as some features may be used or practiced separately from others.

As should be understood to those of ordinary skill in the art, this description is not intended to disclose all possible embodiments of the invention and combinations of features thereof, and this description should not be interpreted to apply only to the specific exemplary apparatuses described herein or the exemplary methods described herein, or exemplary combination of features. That is, the inventor expressly contemplates that the invention includes any combination or sub-combination of features described herein, regardless of whether such are explicitly described or shown herein.

As also may be recognized by those of ordinary skill in the pertinent art based on the teachings herein, numerous changes and modifications may be made to the above-described and other embodiments of the present disclosure without departing from the spirit of the invention as defined in the claims. Accordingly, this detailed description is to be taken in an illustrative, as opposed to a limiting sense.

What is claimed is:

1. An authentication framework comprising:
a Client configured to present an authentication request to a user attempting to sign in or to be authenticated by the Client via a Point of Client Authentication Requirement in order to access an electronic system; and
a first database accessible by the Client;
wherein the Client is configured to receive (i) a first Identity Factor from said user and, (ii) when a second Identity Factor is required by the Client for said user to sign in or be authenticated by the Client, receive a second Identity Factor from said user; and
wherein the Client is configured to determine whether a first Identity Factor of said user and/or a second Identity Factor of said user received by the Client matches corresponding information in the first database;
the framework further including a Central Global Database comprising a second database;
wherein the Client is configured to (i) inform the Central Global Database that said user is attempting to sign in or to be authenticated by the Client; (ii) forward to the Central Global Database a first Identity Factor and/or a second Identity Factor the Client receives from said user to the Central Global Database; and (iii) and report to the Central Global Database said determination by the Client whether said first Identity Factor of said user and/or said second Identity Factor of said user received by the Client matches corresponding information in the first database;
wherein the Central Global Database is configured to search for current knowledge about said user using
data gathered from said user's current attempt to sign in or to be authenticated by the Client,
data from a history of previous attempts by said user to sign in or otherwise to be authenticated by the Client via other Points of Client Authentication Requirement,
other metrics including an IP address from which said user is currently attempting to sign in or be authenticated,
past and/or present key entry speed of said user,
previous habits of said user,
information that said user has previously inputted to the Central Global Database, and/or
other information which the Central Global Database received through subscription to third party resources;
wherein the Central Global Database is configured to determine whether any Flags exist with respect to said user's current attempt to sign in or to be authenticated by the Client, and, when any Flags exist, the framework is configured to (i) transmitting to said user a request for said user to provide an additional Identity Factor comprising an activity, location and/or authentication transaction of said user occurring within a day of said user's current attempt to sign in or to be authenticated by the Client; and (2) transmit a received said additional Identity Factor to the Central Global Database;
wherein the Central Global Database is configured to evaluate the authentication of said user using said additional Identify Factor;
wherein the framework is configured to request from said user further said additional Identity Factors and evaluate the authentication of said user using said further said additional Identify Factors until no Flags exist;
wherein the Central Global Database is configured to, when no Flags exist, provide confirmation of authentication of said user to the Client; and
wherein the Client is configured to grant said user access to said electronic system after receiving said confirmation of authentication of said user from the Central Global Database.

2. The authentication framework according to claim 1, wherein
when the Client utilizes a first additional factor protocol the Central Global Database is configured to transmit a request to the Client, whereby the Central Global Database requests the Client to request said additional Identity Factor from said user;

the Client is configured to request from said user said additional Identity Factor; and the Client is configured to transmit to the Central Global database any said additional Identity Factor the Client receives from said user; and when the Client uses a second additional factor protocol, the Client is configured to proxy the Central Global Database to request said additional Identity Factor from said user.

3. The authentication network according to claim 1, wherein, when the Client or the Central Global Database received a changed first Identity Factor, a changed second Identity Factor and/or a changed additional Identity Factor from said user prior to said user's current attempt to sign in or to be authenticated by the Client, said Client or said Central Global Database that received the changed first Identity Factor, a changed second Identity Factor and/or a changed additional Identity Factor is configured to transmit said changed first Identity Factor, said changed second Identity Factor and/or said changed additional Identity Factor to the other of the Client or the Central Global Database, and the Client or the Central Global Database that receives said changed first Identity Factor, said changed second Identity Factor and/or said changed additional Identity Factor is configured to respectively update the first database or the second database with said changed first Identity Factor, said changed second Identity Factor and/or said changed additional Identity Factor.

4. The authentication framework according to claim 1, configured for said user to access the Central Global Database and change said user's first Identity Factor and/or second Identity Factor.

5. The authentication framework according to claim 1, wherein the second Identity Factor comprises a Personal Identification Number, a password, or a secret question and answer.

6. The authentication framework according to claim 1, wherein the second Identity Factor comprises a Personal Identification Number, a password, or a secret question and answer.

7. The authentication framework according to claim 1, wherein said history includes previous attempts by said user within a pre-defined previous number of hours or within pre-defined previous number of days.

8. The authentication framework according to claim 1, wherein the additional Identity Factor includes a password or passcode transmittable to a mobile phone of said user, a voiceprint request, or an answer to a secret question.

9. The authentication framework according to claim 1, wherein the additional Identity Factor includes a previous authentication transaction.

10. The authentication framework according to claim 9, wherein the previous authentication transaction includes a previous sign in by or authentication of said user.

11. The authentication framework according to claim 9, wherein the previous authentication transaction includes a previous attempt by said user to sign in by or to be authenticated.

12. The authentication framework according to claim 1, wherein said request for said user to provide an additional Identity Factor includes a question to said user.

13. The authentication framework according to claim 12, wherein the framework is configured to, prior to transmitting to said user said request for said user to provide an additional Identity Factor, generate said question.

14. The authentication framework according to claim 12, wherein the question comprises a multiple-choice question.

15. The authentication framework according to claim 1, wherein the additional Identity Factor comprises an activity of said user, wherein the activity includes a purchase and/or payment of said user.

* * * * *